March 29, 1927.

C. R. HAST 1,622,642

ACCOUNTING DEVICE

Filed June 25, 1925    4 Sheets-Sheet 1

Inventor

C. R. Hast.

By Lacy Lacy, Attorneys

March 29, 1927.
C. R. HAST
ACCOUNTING DEVICE
Filed June 25, 1925    4 Sheets-Sheet 2
1,622,642
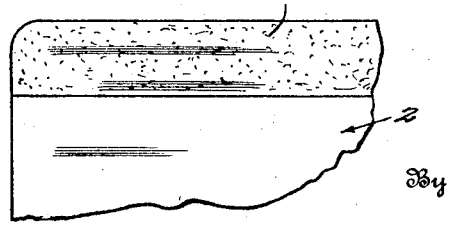

March 29, 1927.
C. R. HAST
ACCOUNTING DEVICE
Filed June 25, 1925
1,622,642
4 Sheets-Sheet 3
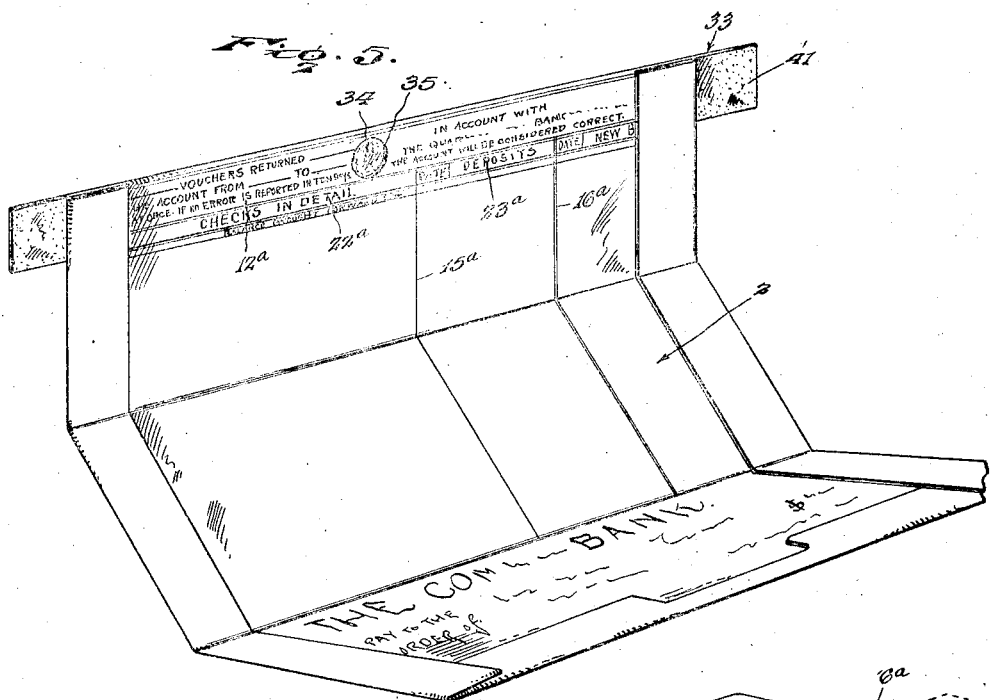
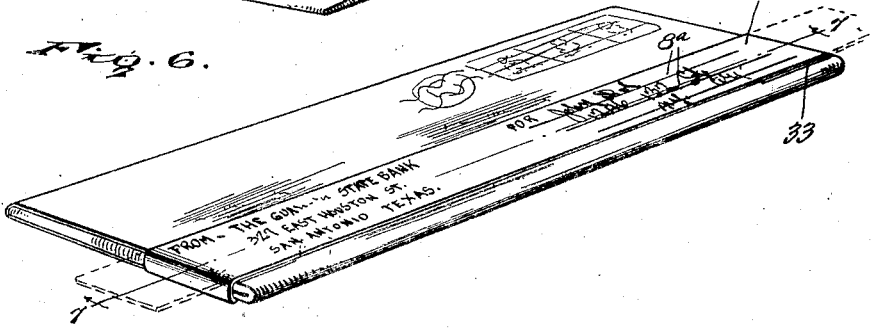
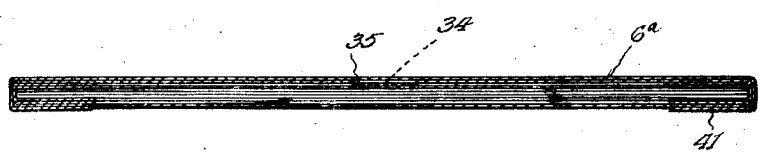
Inventor
C. R. Hast.
By Lacy & Lacy, Attorneys March 29, 1927. 1,622,642
C. R. HAST
ACCOUNTING DEVICE
Filed June 25, 1925    4 Sheets-Sheet 4
Fig. 8.
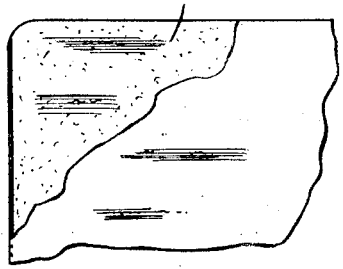
Fig. 9.
Inventor
C. R. Hast.
By
Attorneys Patented Mar. 29, 1927.

1,622,642

UNITED STATES PATENT OFFICE.

CHARLES R. HAST, OF SAN ANTONIO, TEXAS, ASSIGNOR TO PAUL G. VILLARET, OF SAN ANTONIO, TEXAS.

ACCOUNTING DEVICE.

Application filed June 25, 1925. Serial No. 39,540.

This invention relates to improvements in accounting devices and contemplates, generally, the provision of novel forms of ledger and statement sheets or units, the use of which will greatly facilitate the keeping of accounts and the rendering of statements and the mailing of the latter, when employed in connection either with a banking business or a mercantile business, or any other business where ledger accounts are required to be kept and statements required to be mailed.

It has heretofore been customary, in banking institutions, for example, to maintain a customer's or depositor's ledger upon which daily entries are made of deposits received and checks paid, and this ledger represents each customer's daily transactions with the bank. At definite periods, as for example, at the end of each month, an itemized statement is prepared for the customer or depositor, from the ledger, and this statement displays all credits, debits, and daily balances precisely as these items appear on the ledger sheets. The itemized statement thus prepared is then placed in an envelope, which must be separately addressed to the customer or depositor, together with all canceled checks, and the envelope is sealed and mailed to the customer or depositor. It will be evident that the preparation of the itemized statements constitutes a repetition of work performed in entering the daily debit and credit items and daily balances on the ledger sheets, and consumes the same amount of time. It will also be understood that in this method of procedure, errors are extremely liable to occur, and considerable time and labor must frequently be spent in locating the errors and reconciling the two records. Furthermore, the addressing of envelopes in which the customers' or depositors' statements and canceled checks are mailed, requires time and labor. In another method of accounting, a complicated duplicating machine is employed, the ledger and statement sheets being separately inserted in the machine and brought to exact alinement, the entries made on the ledger sheet, and the machine set in operation to automatically shift to the statement sheet and duplicate the entries made on the ledger sheet. The use of such a machine is undesirable, however, because of its complicated and delicate mechanism and its liability to get out of order, to say nothing of the initial high cost of the machine as compared with ordinary typewriters. In consideration of the disadvantages outlined above and which attend the carrying out of the ordinary methods of accounting, the invention has as one of its objects, to provide ledger and statement units possessing such characteristics that when properly assembled, the ledger entries and statement entries may be simultaneously made without any likelihood whatsoever of error, thereby obviating the necessity of preparing a statement by a separate operation, from entries previously made in a ledger or on a ledger sheet, and thus effecting a saving in time and labor in the accounting department, equal to fifty percent of that required under the old method first described above.

Another object of the invention is to provide novel ledger and statement units upon which entries may be made by the use of an ordinary typewriter, thereby obviating the employment of an automatic duplicating machine, such as referred to above.

Another object of the invention is to provide a statement sheet possessing such characteristics that when, at the end of the month or other predetermined period of time when statements are to be rendered to customers, the sheet is separated from the ledger unit, it will constitute not only an accurate statement for the elapsed period of time, but may be folded and sealed in such a manner as to constitute a mailing envelope enclosing the canceled checks for that period of time, thereby entirely obviating the necessity of addressing an individual envelope for mailing to each customer or depositor.

In the accompanying drawings:

Figure 1 is a plan view of the units embodying the invention assembled, parts being broken away to better illustrate the arrangement of the units.

Figure 2 is a vertical longitudinal sectional view through the units, taken substantially on the line 2—2 of Figure 1.

Figure 3 is a plan view of the sheet comprising the statement unit.

Figure 4 is a fragmentary plan view of a portion of the opposite face of the said sheet.

Figure 5 is a perspective view illustrating the statement sheet or unit partly folded to constitute a mailing envelope and enclosure for the canceled checks.

Figure 6 is a perspective view of the sheet completely folded.

Figure 7 is a longitudinal sectional view taken substantially on the line 7—7 of Figure 6, looking in the direction indicated by the arrows.

Figure 8 is a view similar to Figure 1, illustrating a modification of the invention.

Figure 9 is a reverse side view of the modification shown in Figure 8, a portion of the same being broken away.

The invention contemplates novel ledger and statement units indicated in general respectively by the numerals 1 and 2 and designed to constitute substitutes for the ledger sheets and statement sheets, respectively, heretofore employed. The ledger unit 1 is in the nature of a jacket of rectangular form and of any desired size, depending upon the character of the account to be kept, and this jacket comprises two walls indicated by the numeral 3 and the jacket is closed at its lateral margin and likewise at its lower margin, being open at its upper margin and the said walls at their upper margins being preferably recessed or cut away as at 4, so as to expose a portion of the upper margin of the statement sheet or unit 2, to permit of ready withdrawal of the unit from the jacket, the said sheet being normally positioned within the jacket, as clearly illustrated in Figures 1 and 2 of the drawings, and the said statement sheet 2 being of substantially the same marginal dimensions as the jacket 3, so that the sheet and jacket will be substantially in marginal registration when the sheet is inserted into the jacket, and displacement of the sheet will be prevented. One or more horizontal lines 5 are printed upon the outer face of either or both of the walls 3 of the jacket 1 and below and parallel to the upper margin of the jacket to define a heading space 6 at the left of which there is printed, as at 7, the name and address of the bank or other institution employing the devices embodying the invention, several ruled lines 8 being printed in the space 6 at the other side thereof as guides for the typewriting of the name and address of the depositor or customer. Another horizontal line 9 is printed upon the face of the wall or walls 3 of the jacket parallel to and below the line or lines 5, and preferably at the left of the space between these lines there is printed the legend "Sheet No." as indicated by the numeral 10, and at the right of said legend, the legend "Vouchers returned" as indicated by the numeral 11, sufficient space being left at the right hand end of each legend for the entry of the proper notations. Below the legends 10 and 11 and in the said space there is printed a legend, as for example "Statement of your account from ——— to —" as indicated by the numeral 12, and preferably below this legend there is printed, as at 13, a warning to the customer or depositor to examine his statement of account and report errors within a stated period of time. Below the line 9, there are printed vertical lines 14, 15 and 16, defining columns 17, 18, 19 and 20, the column 17 being headed by the legend "Old balance", the column 18 being headed by the legend "Date—Checks in detail", the column 19 being headed by the legend "Date—Deposits", and the column 20 being headed by the legend "Date—New balance", these legends being indicated respectively by the numerals 21, 22, 23 and 24. Below the legend 22 there is printed the legend "Balance brought forward", at the head of the column 18, and immediately at the left of the upper end of the column 19, as indicated by the numeral 25, indicating that this item is to be entered at the extreme upper end of the said column 19.

As stated above, the outer faces of both of the walls 3 of the jacket may bear the printed indicia referred to so that when one side of the jacket has been filled with entries, the other side of the jacket may be employed, thereby effecting an economy in the number of jackets used.

In order that the ledger jacket may be filed in a suitable binder, it may be provided at its lower margin with a number of notches 26 and, if desired, with perforations 27 in its walls 3 to accommodate the locking rod of a filing device employing such a rod. Upon the outer faces of the walls of the jacket and in proximity to the openings 27, there is printed the legend "Hold here to remove statement" as indicated by the numeral 28.

The statement unit, which is indicated in general by the numeral 2, comprises a statement sheet 29 which, as previously stated, is of substantially the same dimensions as the interior of the jacket 1 and is housed or retained within the jacket. The said statement sheet bears upon its face printed legends identical with the printed legends upon the face or faces of the jacket 1, and to avoid repetition of the description of these legends and the printed lines, corresponding legends and corresponding lines upon the statement sheet 29 are indicated by the same reference numerals as those employed in Figure 1, with the addition of the suffix "a," corresponding legends, lines and spaces upon the ledger jacket and statement sheet being correspondingly located, as will be evident by a comparison of Figures 1 and 3 of the drawings. In this maner economy is effected, the statement sheet being printed from the same form as that employed in printing the ledger jacket except that, after the jacket has been printed, the form will be slightly revised to include the legend 30

"Fold back along this line" directly above the line 5ª and, the legend "Break here", or a legend having similar significance as indicated by the numeral 31, above the said line and at the ends thereof. In juxtaposition to each of the legends 31 and along the end portions of the line 5ª, the statement sheet 29 is provided with short lines of perforations indicated by the numeral 32, and preferably each lateral margin of the sheet is formed with a notch 33 at the outer ends of the respective lines of perforations 32. The upper margin of the sheet 29 is not provided with any recess coresponding to the recesses 4 in the upper margins of the walls of the ledger jacket, but is left intact, so that the intermediate portion of the upper margin of the sheet will be exposed within the recesses 4, when the sheet is in place in the ledger jacket as shown in Figure 1, to permit of its being readily grasped and withdrawn from the jacket at the end of the accounting period.

For a purpose to be presently explained, the reverse side of the statement sheet 29, between its upper margin and the ruled line 5ª, is provided with a coating 34 of adhesive, and at its vertical middle the sheet is formed with an opening 35 which is located below said line 5ª. The statement sheet 29 is formed in its lower margin with notches 36 which are designed to register with certain of the notches 26 formed in the lower margin of the ledger jacket 1, and the said lower margin of the sheet 29 at its intermediate portion, is formed with a relatively long recess 37, the upper side of which is spaced above the closed bottom of the ledger jacket when the sheet is inserted in the jacket, a distance sufficient to permit of the jacket being grasped at its portion which bears the legend 28, at the same time the exposed upper margin of the sheet 29 is grasped for the purpose of withdrawing the sheet from the jacket, this operation being in this manner facilitated. A horizontal line 38 is printed upon the face of the statement sheet 29 above the lower margin thereof and intersects the line 14ª, 15ª, and 16ª, and at the bottom of the column 20ª there is printed, as at 39, a statement indicating that the last amount in said column is the balance at the date of the statement.

The numeral 40 indicates a sheet of carbon paper which is employed in connection with the ledger jacket and statement sheet, and in assembling the component parts of the device, the statement sheet is inserted into the ledger jacket with its printed face presented to the back or inner side of one or the other of the walls 3 of the ledger jacket bearing the printed indicia, and the carbon sheet 40 is inserted into the jacket between said side or wall of the jacket and the printed face of the statement sheet with its carbon surface presented to the printed face of said sheet.

One of the assemblages of the units is, of course, provided for each depositor or customer and, at the end of each day, the deposits made and checks paid are entered upon the face of the ledger jacket and the daily balance is struck and brought forward, this being accomplished by inserting the assemblage in an ordinary typewriter and typing the entries, the customer's or depositor's name and address having been previously typed upon the line 8 and the other data having been filled in according to the legends. It will be evident at this point that the entries made upon the ledger jacket 1 will be duplicated upon the statement sheet 2. At the end of the month or other predetermined accounting period, the statement sheet will be withdrawn from the ledger jacket and will bear an exact record of all debits, credits, and daily balances for the accounting period. After the statement sheet has been removed, its lower marginal portion is folded back upon its face substantially along the line 38, the sheet is torn along the lines of perforations 32, and the lateral marginal portions of the sheet are folded inwardly along perpendicular lines dropped from the inner ends of the said lines of perforations 32, as shown in Figure 5 of the drawings. The canceled checks of the depositor are disposed upon the face of the sheet within the pocket formed by the folded over lower and lateral marginal portions of the sheet, as shown in the said figure, and the sheet is then folded transversely two or more times, as clearly indicated in the said Figure 5, so as to completely enclose the said canceled checks. The gummed area 34 of the statement sheet 29 is then moistened and the upper marginal portion of the sheet is folded back along the lower edge of this area or, in other words, along the line 5ª so that the said upper marginal portion of the sheet will adhere to the back of the sheet and a portion of the gummed area will be exposed through the opening 35, the upper corner portions of the sheet above the lines of perforations 32, projecting beyond the lateral folds in the sheet, as shown in Figure 5. The said upper portion of the sheet is then brought to position against the back or reverse side of the lower portion of the sheet, through the operation of transversely folding the sheet as previously stated, and the projecting tab portions or, in other words, the upper corner portions of the sheet, which are indicated in Figure 5 by the numeral 41, are folded over and united to the back of the envelope or enclosure thus provided, the portion of the gummed area 34 which is exposed through the opening 35 being pressed into contact with the surface of the sheet which it opposes, thereby uniting the intermediate portion of the final fold to the sheet to prevent lifting of the flap of the envelope formed in the manner stated. In folding back the upper marginal portion of the sheet and then folding the sheet to form the envelope enclosing the canceled checks, the name and address of the depositor or customer, which have been typed above the line 8ª, are exposed to view, as well as the name and address of the bank, indicated at 7ª the former constituting a forwarding address and the latter the equivalent of the usual return address upon a printed envelope. In this manner, the sheet 29 serves not only as a statement but also as a medium whereby canceled checks may be mailed to the depositor or customer without the employment of separate mailing envelopes and it will be evident that the name and address of the depositor or customer originally typed upon the sheet constitutes the mailing address and obviates the necessity of separately typewriting the same as where ordinary envelopes are employed.

It will be understood, of course, that when a statement sheet is removed from the ledger jacket, at the end of an accounting period and the beginning of a new accounting period, a new sheet is inserted in the jacket so that entries for the succeeding or new accounting period will be made thereon, in duplicate, at the time they are entered upon the ledger jacket.

Figures 8 and 9 of the drawings illustrate a modification of the invention in which the ledger jacket, indicated by the numeral 42, is provided upon the inner face of one of its walls with a coating 43 of carbon, thereby obviating the necessity of employing a separate sheet of carbon paper. Otherwise, the structure shown in Figures 8 and 9 is substantially identical with that illustrated in the preceding figures.

Having thus described the invention, what I claim is:

1. An account statement sheet having indicia thereon for the entry of debits, credits, balances, and data relating to the account, the sheet, at one marginal portion having a space for the entry of the name and address of the customer or depositor, the sheet being weakened along lines parallel to said margin and extending inwardly from the contiguous margins, whereby, when the sheet is torn along said lines, the contiguous marginal portions may be folded inwardly as well as the marginal portion opposite the first mentioned marginal portion, and whereby projecting tabs will be provided at the ends of the first mentioned marginal portions adapted to be engaged about and secured to a portion of the sheet when the sheet is folded upon itself in the form of an envelope, and whereby the first mentioned marginal portion which bears the name and address of the customer or depositor will be exposed at the exterior of the folded sheet.

2. An account statement sheet having indicia thereon for the entry of debits, credits, balances, and data relating to the account, the sheet, at one marginal portion having a space for the entry of the name and address of the customer or depositor, the sheet being weakened along lines parallel to said margin and extending inwardly from the contiguous margins, whereby, when the sheet is torn along said lines, the contiguous marginal portions may be folded inwardly as well as the marginal portion opposite the first mentioned marginal portion, and whereby projecting tabs will be provided at the ends of the first mentioned marginal portion adapted to be engaged about and secured to a portion of the sheet when the sheet is folded upon itself in the form of an envelope, and whereby the first mentioned marginal portion which bears the name and address of the customer or depositor will be exposed at the exterior of the folded sheet, the reverse side of the first mentioned marginal portion carrying a coating of an adhesive.

3. An account statement sheet having indicia thereon for the entry of debits, credits, balances, and data relating to the account, the sheet, at one marginal portion having a space for the entry of the name and address of the customer or depositor, the sheet being weakened along lines parallel to said margin and extending inwardly from the contiguous margins, whereby, when the sheet is torn along said lines the contiguous marginal portions may be folded inwardly as well as the marginal portion opposite the first mentioned marginal portion, and whereby projecting tabs will be provided at the ends of the first mentioned marginal portion adapted to be engaged about and secured to a portion of the sheet when the sheet is folded upon itself in the form of an envelope, and whereby the first mentioned marginal portion which bears the name and address of the customer or depositor will be exposed at the exterior of the folded sheet, the reverse side of the first mentioned marginal portion carrying a coating of an adhesive, and the said sheet at its intermediate portion and in proximity to the said first mentioned marginal portion, having an opening through which a portion of the adhesive-bearing surface is exposed when the first mentioned marginal portion is folded back upon the sheet.

4. An account statement sheet which is to serve also as a mailing medium, comprising a sheet having indicia thereon for the entry of debits, credits, balances, and data relating to the account, the upper marginal portion of the sheet having a space for the entry of the name and address of the customer or depositor to whom the statement is to be mailed, the sheet being severed along weakened lines extending inwardly from the side margins of the sheet, the marginal portions of the sheet below the first mentioned marginal portion being folded inwardly upon the face of the sheet, the lower marginal portion of the sheet being folded inwardly against the face of the sheet whereby the marginal portions provide a pocket accommodating canceled checks, the body being folded upon itself to enclose the said checks, the reverse side of the first mentioned marginal portion of the sheet being provided with a coating of adhesive, the said marginal portion being folded back against the reverse side of the sheet and secured thereto by the adhesive area with its end portions projecting beyond the folded body of the sheet, the said end portions being folded over the edges of the folded body of the sheet and united by their adhesive surfaces to the back of the folded body whereby to seal the same and constitute an enclosure or envelope for the canceled checks, with the name and address of the customer or depositor exposed for mailing purposes.

5. An account statement sheet which is to serve also as a mailing medium, comprising a sheet having indicia thereon for the entry of debits, credits, balances, and data relating to the account, the upper marginal portion of the sheet having a space for the entry of the name and address of the customer or depositor to whom the statement is to be mailed, the sheet being severed along weakened lines extending inwardly from the side margins of the sheet, the marginal portions of the sheet below the first mentioned marginal portion being folded inwardly upon the face of the sheet, the lower marginal portion of the sheet being folded inwardly against the face of the sheet whereby the marginal portions provide a pocket accommodating canceled checks, the body being folded upon itself to enclose the said checks, the reverse side of the first mentioned marginal portion of the sheet being provided with a coating of adhesive, the said marginal portion being folded back against the reverse side of the sheet and secured thereto by the adhesive area with its end portions projecting beyond the folded body of the sheet, the said end portions being folded over the edges of the folded body of the sheet and united by their adhesive surfaces to the back of the folded body whereby to seal the same and constitute an enclosure or envelope for the canceled checks, with the name and address of the customer or depositor exposed for mailing purposes, the body of the sheet at its intermediate portion and adjacent to the first mentioned marginal portion, having an opening through which a portion of the adhesive-bearing surface of the first mentioned marginal portion of the sheet is exposed and united to one of the folds of the body of the sheet.

6. Means for the keeping of a permanent and continuous record of an account and the rendering of periodical statements thereof, comprising a ledger unit in the form of a jacket, and a statement unit in the form of a statement sheet removably fitted into the said ledger unit, one face of the jacket and one face of the statement sheet bearing corresponding indicia for the entry of data indicative of the transactions incident to the account, whereby, by the employment of a carbon sheet between the indicia-bearing side of the jacket and the face of the statement sheet, entries made upon the ledger unit jacket will be duplicated upon the statement unit sheet, the statement unit sheet bearing upon its indicia-bearing face at its upper marginal portion, indicia for the entry of the name and address of the one to whom the statement of account is to be rendered, the corresponding portion of the other face of the said statement sheet being gummed, the said statement sheet having weakened lines extending inwardly from its lateral margins at the lower side of the gummed area thereof whereby, when the sheet is severed along said lines, the said marginal portions may be folded in and whereby when the sheet is itself folded, checks may be arranged within the folded sheet and retained against displacement by the folded-in margins of the sheet, the marginal portions of the sheet above the said weakened lines constituting sealing tabs as also the gummed area between said tabs to be adhesively secured to another portion of the folded sheet to seal the same in its folded condition.

In testimony whereof I affix my signature.

CHARLES R. HAST. [L. S.]